United States Patent
Sawada et al.

(10) Patent No.: US 8,855,659 B2
(45) Date of Patent: Oct. 7, 2014

(54) TRANSMISSION DEVICE AND TRANSMISSION METHOD

(75) Inventors: Kengo Sawada, Tokyo (JP); Masataka Wakamatsu, Kanagawa (JP); Kenji Shiba, Tokyo (JP)

(73) Assignee: Sony Corporation, Tokyo (JP)

( * ) Notice: Subject to any disclaimer, the term of this patent is extended or adjusted under 35 U.S.C. 154(b) by 706 days.

(21) Appl. No.: 13/064,052

(22) Filed: Mar. 3, 2011

(65) Prior Publication Data
US 2011/0249818 A1 Oct. 13, 2011

(30) Foreign Application Priority Data

Apr. 8, 2010 (JP) ................................. 2010-089813

(51) Int. Cl.
H04W 72/04 (2009.01)
H04W 74/04 (2009.01)
H04W 52/28 (2009.01)
H04W 52/36 (2009.01)
H04W 52/14 (2009.01)
H04W 52/10 (2009.01)

(52) U.S. Cl.
CPC .......... *H04W 52/281* (2013.01); *H04W 52/367* (2013.01); *H04W 52/143* (2013.01); *H04W 52/10* (2013.01)
USPC ............ 455/450; 455/522; 370/345; 370/442

(58) Field of Classification Search
USPC ......... 370/345, 442, 331, 318; 455/67.1, 436, 455/450, 522
See application file for complete search history.

(56) References Cited

U.S. PATENT DOCUMENTS

| 5,561,849 | A | * | 10/1996 | Mankovitz | 455/45 |
| 6,411,817 | B1 | | 6/2002 | Cheng et al. | |
| 7,584,976 | B2 | | 9/2009 | Bayne et al. | |
| 8,406,717 | B1 | * | 3/2013 | Lou | 455/214 |
| 2007/0232341 | A1 | * | 10/2007 | Sakata | 455/509 |

FOREIGN PATENT DOCUMENTS

| JP | 2001-244881 | 9/2001 |
| JP | 2008-244836 | 10/2008 |
| JP | 2008-539670 | 11/2008 |

* cited by examiner

*Primary Examiner* — Duc Nguyen
*Assistant Examiner* — George Monikang
(74) *Attorney, Agent, or Firm* — Rader, Fishman & Grauer PLLC

(57) ABSTRACT

A transmission device includes a transmission power setting unit that respectively sets a transmission power for transmitting a main sound signal indicating a main sound and transmission powers for transmitting one or two or more subsidiary sound signals which pertain to the main sound signal and which realize a predetermined sound effect, and a first communication unit that respectively transmits the main sound signal and the one or two or more subsidiary sound signals on time division channels using the same frequency band, based on the transmission powers set by the transmission power setting unit, wherein the transmission power setting unit sets the transmission power for the main sound signal to a first reference value, and sets the transmission powers for the subsidiary sound signals to a second reference value smaller than the first reference value.

7 Claims, 10 Drawing Sheets

FIG. 2
| CH | SOUND DATA |
|---|---|
| 1 | DVD DOWN MIX (MAIN SOUND) |
| 2 | SURROUND REAR (SURROUND SOUND) |
| 3 | SURROUND BACK (SURROUND SOUND) |
| 4 | SURROUND FAR (SURROUND SOUND) |
Channels 2-4: SUBSIDIARY SOUND
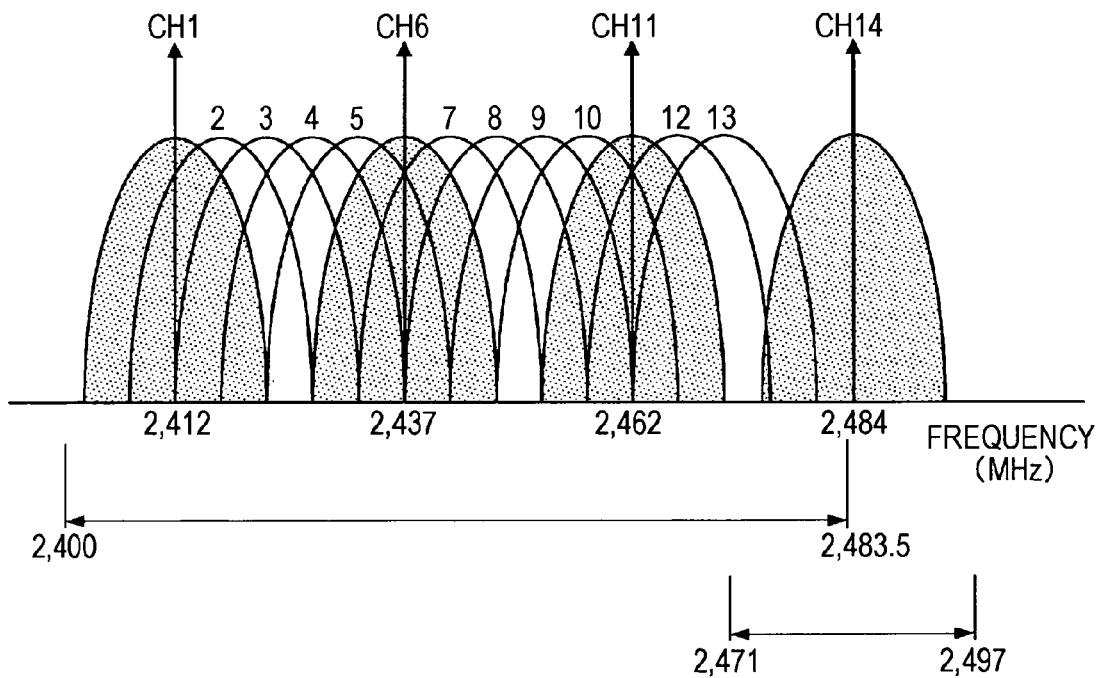
FIG. 3
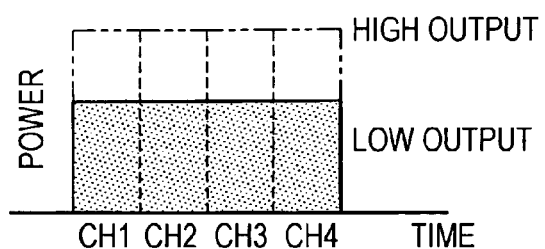
FIG. 4

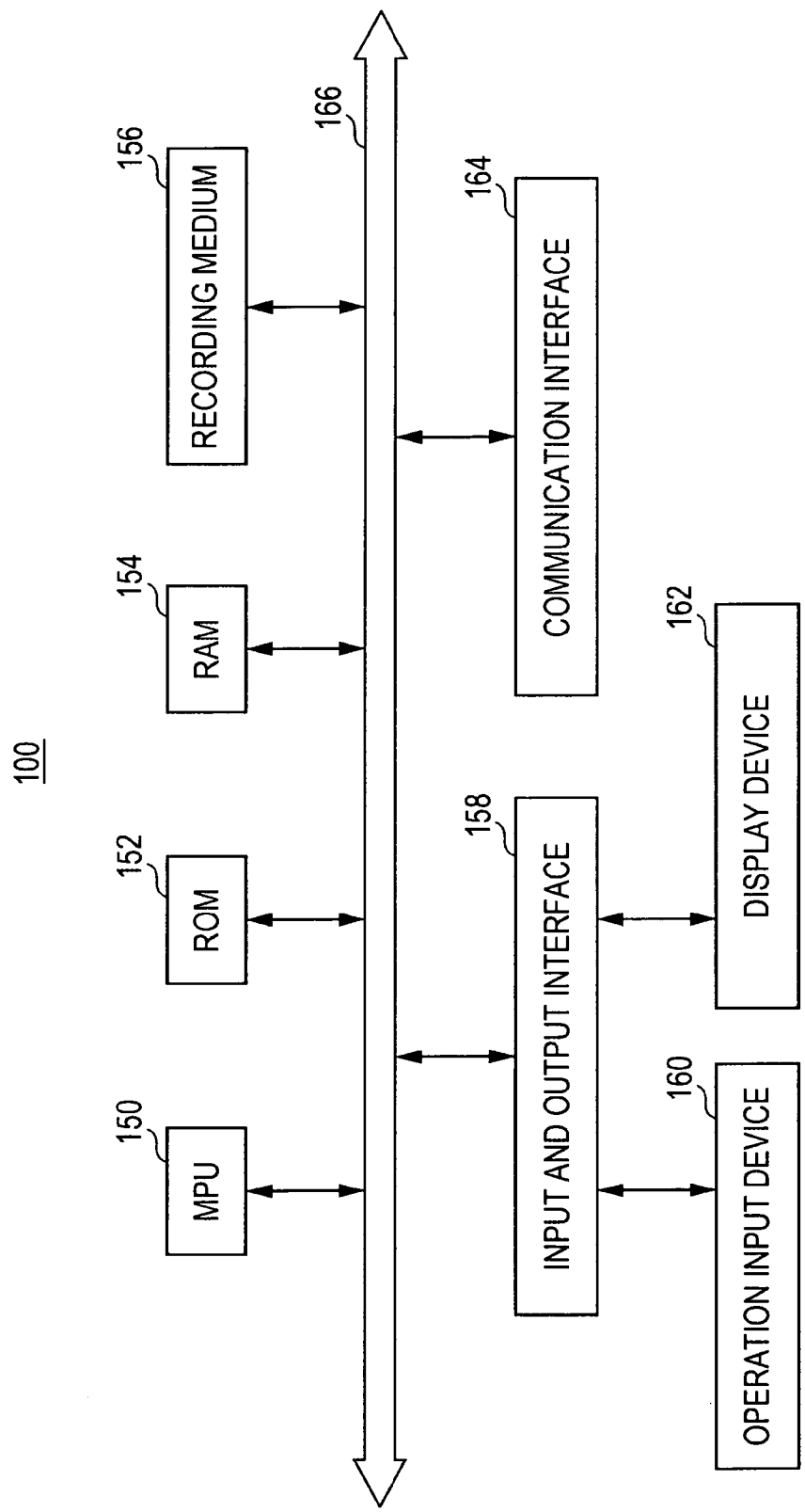

TRANSMISSION DEVICE AND TRANSMISSION METHOD

BACKGROUND OF THE INVENTION

1. Field of the Invention

The present invention relates to a transmission device and a transmission method.

2. Description of the Related Art

In recent years, a wireless communication system has been diffused in which transmission and reception of signals can be performed between devices using wireless communication such as communication through a wireless LAN (Wireless Local Area Network).

In the course of this diffusion, there has been developed a technique for reducing interference (electric wave interference) of one wireless communication with another wireless communication. In wireless communication using TDMA (Time Division Multiple Access), as techniques for reducing interference between time division channels, for example, there is a technique disclosed in Japanese Unexamined Patent Application Publications No. 2001-244881.

SUMMARY OF THE INVENTION

With the diffusion of wireless communication systems, a plurality of wireless communication systems usually exists together in a certain range (for example, in a house). As described above, when the wireless communication systems exist together in the same range, communication in one wireless communication system interferes with communication in another wireless communication system, and thus the communication in the corresponding system may be inhibited. For this reason, in the wireless communication system, when wireless communication systems exist together in the same range as described above, frequency hopping is performed in which the frequency bands used to communicate are slightly shifted so as to prevent the generation of interference with communication in another wireless communication system.

However, even if the frequency bands used to communicate are shifted by frequency hopping, there are cases where communication interference occurs due to various factors, such as, for example, a case where a device constituting a wireless communication system is closed to a device constituting another wireless communication system. In addition, even if frequency hopping is used, the communication interference which has occurred may not be reduced. Therefore, even if the frequency hopping is used, there is a problem in that communication in a certain wireless communication system interferes with communication in another wireless communication system, and thus the communication in another wireless communication system is inhibited.

In addition, an example of the wireless communication system includes, for example, a sound signal transmission system in which a transmission device transmits sound signals indicating music, sound or the like on a plurality of time division channels using the same frequency band to a plurality of reception device (for example, a multi-channel audio system). Here, for example, when the transmission device transmits sound signals to the plurality of reception devices on the time division channels as in the sound signal transmission system, a time occupancy of sound signals transmitted at a certain time slot is higher than that in a case where the transmission device transmits sound signals to a single reception device. Therefore, in the case where the wireless communication system is the sound signal transmission system, if communication in the sound signal transmission system interferes with communication in another wireless communication system, there is a problem in that an influence of the interference with communication in the corresponding wireless communication system further increases.

Here, in a wireless communication system in which a plurality of sound signals is transmitted on time division channels using the same frequency band (hereinafter, referred to as a "sound signal transmission system"), as methods for reducing interference with communication in another wireless communication system, for example, there are the following methods (a) and (b).

(a) To collectively decrease transmission powers for sound signals transmitted on the respective time division channels in the transmission device (b) To decrease the number of the time division channels on which sound signals are transmitted in the transmission device In the case of using the method (a), since the transmission power for the sound signals transmitted on the respective time division channels are collectively decreased in the sound signal transmission system, it is possible to reduce interference with communication in another wireless communication system. However, in the case of using the method (a), since the transmission power for the sound signals transmitted on the respective time division channels are collectively decreased, a possibility that a sound signal for each time division channel transmitted from the transmission device is not normally received by the reception device is further heightened. Therefore, in the case of using the method (a), there is a problem in that, in some cases, a predetermined sound effect which is realized by the sound signals transmitted on the respective time division channels, such as, for example, a stereophonic effect, may not be achieved in the sound signal transmission system.

In addition, in the case of using the method (b), since the number of the time division channels is reduced, a time occupancy of the transmitted sound signals can be lowered. Therefore, in the case of using the method (b), it is possible to reduce the interference with communication in another wireless communication system. However, in the case of using the method (b), since the number of the time division channels is reduced, there is a problem in that sound signals necessary to realize a predetermined sound effect such as, for example, a stereophonic effect may not be transmitted from the transmission device to the reception device in the sound signal transmission system. Accordingly, in the case of using the method (b), there is a problem in that, in some cases, a predetermined sound effect which is realized by the sound signals transmitted on the respective time division channels, such as, for example, a stereophonic effect, is not achieved in the sound signal transmission system.

As described above, in the case of using the methods (a) and (b), there is a possibility that a predetermined sound effect is not achieved in the sound signal transmission system. Thus, in the case of using the methods (a) and (b), even if the interference with communication in another wireless communication system can be reduced, there is a problem in that convenience for a user in the sound signal transmission system is reduced.

In addition, in a wireless communication system which uses the related art for reducing interference with another wireless communication of certain wireless communication (hereinafter, simply referred to as the "related art"), each of the reception devices receiving signals on the respective time division channels in the TDMA generates adjustment data which makes a transmission power adjusted in the transmission device, based on the received signals. In the wireless communication system using the related art, each of the reception devices transmits the adjustment data to the transmission device, and the transmission device adjusts transmission powers for signals transmitted to the respective reception devices, based on the adjustment data obtained from the respective reception devices. In addition, in the wireless communication system using the related art, the transmission device transmits signals at the adjusted transmission power. Therefore, by using the related art, there is a possibility that interference between time division channels in TDMA can be reduced.

However, the related art is merely for reducing the interference between the time division channels in TDMA. Thus, even if the related art is used, it is difficult to expect that interference of communication in the sound signal transmission system with communication in another wireless communication system is reduced.

It is desirable to provide novel and improved transmission device and transmission method, capable of preventing a reduction in convenience for a user and of decreasing interference with communication in another wireless communication system, in a sound signal transmission system in which a plurality of sound signals is transmitted on a plurality of time division channels using the same frequency band.

According to an embodiment of the present invention, there is provided a transmission device including a transmission power setting unit that respectively sets a transmission power for transmitting a main sound signal indicating a main sound and transmission powers for transmitting one or two or more subsidiary sound signals which pertain to the main sound signal and which realize a predetermined sound effect; and a first communication unit that respectively transmits the main sound signal and the one or two or more subsidiary sound signals on time division channels using the same frequency band, based on the transmission powers set by the transmission power setting unit, wherein the transmission power setting unit sets the transmission power for the main sound signal to a first reference value, and sets the transmission powers for the subsidiary sound signals to a second reference value smaller than the first reference value.

Due to the above-described configuration, it is possible to implement a sound signal transmission system which can prevent a reduction in convenience for a user and decrease interference with communication in another wireless communication system.

The transmission power setting unit may respectively adjust a transmission power for the main sound signal and transmission powers for the subsidiary sound signals, which are set based on the number of negative acknowledgement packets for each time division channel which are received by the first communication unit during a predetermined period.

The transmission power setting unit may respectively compare the number of the negative acknowledgement packets for each time division channel received by the first communication unit during the predetermined period with a predetermined lower limit, and when the number of the negative acknowledgement packets is equal to or less than the predetermined lower limit or smaller than the lower limit, set a transmission power for a sound signal transmitted on a time division channel corresponding to negative acknowledgement packets, for which the number of the negative acknowledgement packets is equal to or less than the lower limit or smaller than the lower limit, to a smaller value than a set value. Also, the transmission power setting unit may respectively compare the number of the negative acknowledgement packets for each time division channel with a predetermined upper limit, and when the number of the negative acknowl- edgement packets is equal to or more than the predetermined upper limit or larger than the upper limit, set a transmission power for a sound signal transmitted on a time division channel corresponding to negative acknowledgement packets, for which the number of the negative acknowledgement packets is equal to or more than the upper limit or larger than the upper limit, to a larger value than a set value.

The first reference value may indicate a maximal transmission power for a sound signal transmitted by the first communication unit.

The transmission device may further include a second communication unit that communicates with an external device via a communication path different from the first communication unit; and a transmission order setting unit that sets an order of the main sound signal and the subsidiary sound signals to be transmitted based on a communication state of the second communication unit, wherein the first communication unit transmits the main sound signal and the subsidiary sound signals in the order set by the transmission order setting unit.

According to another embodiment of the present invention, there is provided a transmission method including the steps of respectively setting a transmission power for transmitting a main sound signal indicating a main sound and transmission powers for transmitting one or two or more subsidiary sound signals which pertain to the main sound signal and which realize a predetermined sound effect; and respectively transmitting the main sound signal and the one or two or more subsidiary sound signals on time division channels using the same frequency band, based on the transmission powers set in the setting step, wherein in the setting step, the transmission power for the main sound signal is set to a first reference value, and the transmission powers for the subsidiary sound signals are set to a second reference value smaller than the first reference value.

By using the method, it is possible to implement a sound signal transmission system which can prevent a reduction in convenience for a user and decrease interference with communication in another wireless communication system.

According to an embodiment of the present invention, it is possible to prevent a reduction in convenience for a user and to reduce interference with communication in another wireless communication system, in a sound signal transmission system in which a plurality of sound signals is transmitted on a plurality of time division channels using the same frequency band.

BRIEF DESCRIPTION OF THE DRAWINGS

FIG. 2 is a diagram illustrating an example where transmitted sound signals are allocated to time division channels in a transmission device according to an embodiment of the present invention.

FIG. 3 is a diagram illustrating frequency hopping.

FIG. 4 is a diagram illustrating a first example of a method for reducing interference with communication in another wireless communication system.

FIG. 14 is a diagram illustrating a hardware configuration example of the transmission device according to the embodiment of the present invention.

DESCRIPTION OF THE PREFERRED EMBODIMENTS

Figure 1:
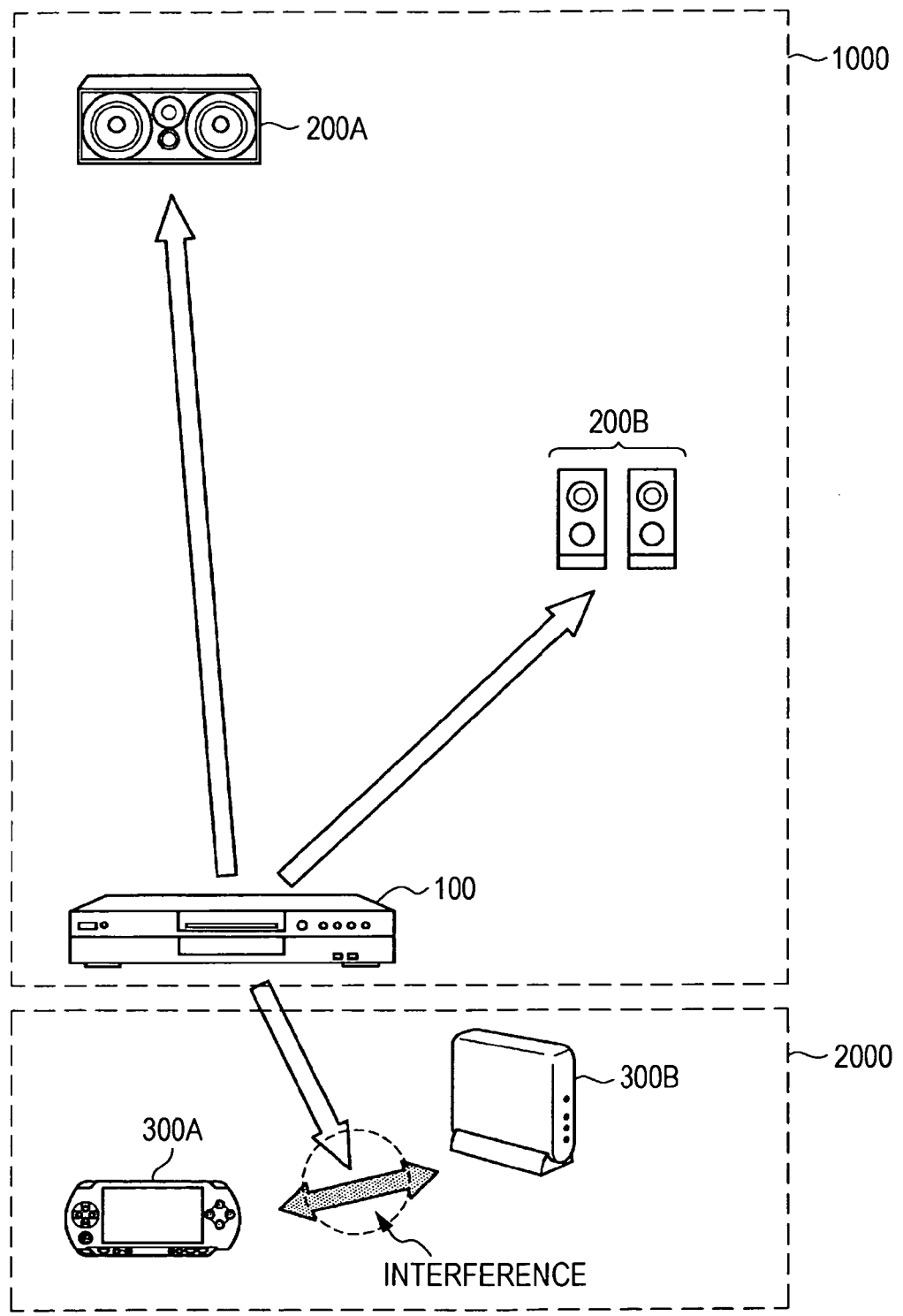
FIG. 1 is a diagram illustrating a configuration example of a sound signal transmission system according to an embodiment of the present invention.

Hereinafter, preferred embodiments of the present invention will be described with reference to the accompanying drawings. In addition, throughout this specification and the drawings, constituent elements having substantially the same functional configurations are given the same reference numerals and the description thereof will be omitted.

The description will be made in the following order.

1. Approach according to Embodiment of Present Invention

2. Transmission device according to Embodiment of Present Invention

3. Program according to Embodiment of Present Invention

Approach According to Embodiment of Present Invention

Prior to describing configurations of respective devices constituting a sound signal transmission system (hereinafter, referred to as a "sound signal transmission system 1000" in some cases) according to an embodiment of the present invention, a sound signal transmission approach according to an embodiment of the present invention, for preventing a reduction in convenience for a user and decreasing interference with communication in another wireless communication system will be described.

Outline of Sound Signal Transmission System 1000

First, an outline of the sound signal transmission system will be described prior to description of an outline of the sound signal transmission approach according to the embodiment of the present invention. FIG. 1 is a diagram illustrating the sound signal transmission system 1000 according to the embodiment of the present invention. Here, FIG. 1 shows together a wireless communication system 2000 in which a communication device 300A communicates with a communication device 300B and which is different from the sound signal transmission system 1000.

The sound signal transmission system 1000 includes a transmission device 100 and reception devices 200A and 200B (hereinafter, in some case, collectively referred to as "reception devices 200"), and the transmission device 100 wirelessly communicates with each of the reception devices 200. In addition, in the sound signal transmission system 1000 according to the embodiment of the present invention, for example, the transmission device 100 may be connected to either of the reception devices 200 constituting the sound signal transmission system 1000 in a wired manner. Further, although two reception devices 200 are shown in FIG. 1, the number of the reception devices 200 constituting the sound signal transmission system 1000 according to the embodiment of the present invention is not limited to the example shown in FIG. 1. For example, the sound signal transmission system 1000 may have a configuration including three or more reception devices 200. In addition, although the image and sound reproducing device (or image and sound recording and reproducing device) is shown as the transmission device 100 and the speakers are shown as the reception devices 200 in FIG. 1, the transmission device 100 and the reception devices 200 according to the embodiment of the present invention are limited to the example shown in FIG. 1.

The transmission device 100 respectively transmits (wirelessly transmits) a main sound signal and subsidiary sound signals (hereinafter, in some cases, collectively referred to as "sound signals") on time division channels using the same frequency band (frequency channel). Hereinafter, in some cases, the time division channels are simply indicated by "channel", and the channel is denoted by "CH" in the figures.

Here, the main sound signal is a sound signal indicating main sound in content data reproduced by, for example, the transmission device 100 or an external device (for example, a reproducing device) connected to the transmission device 100. In addition, the subsidiary sound signals are sound signals indicating subsidiary sound which pertains to the main sound signal and realizes a predetermined sound effect. Examples of the predetermined sound effect realized by the sound signals which are transmitted by the transmission device 100 include a stereophonic effect, a surround effect, and the like.

FIG. 2 is a diagram illustrating an example where the transmitted sound signals are allocated to time division channels in the transmission device 100 according to the embodiment of the present invention. FIG. 2 shows an example where the transmission device 100 transmits sound signals on four time division channels, and the main sound signal is transmitted on a channel 1 and subsidiary sound signals are transmitted on channels 2 to 4. For example, as shown in FIG. 2, the transmission device 100 stores setting information in which the channels are correlated with sound types indicated by the transmitted sound signals, and allocates the transmitted sound signals to the respective channels based on the stored setting information.

In addition, the transmission device 100 according to the embodiment of the present invention is not limited to transmitting the sound signals on the four channels but may transmit sound signals on the number of channels according to the number of the sound signals transmitted to the reception devices 200 in order to realize a predetermined sound effect. In addition, the transmission device 100 is not limited to allocating the transmitted sound signals to the respective channels based on the stored setting information, but, for example, may obtain setting information from an external device such as a server (not shown) and allocate the transmitted sound signals to the respective channels based on the obtained setting information. In addition, the allocation of the transmitted sound signals to the time division channels in the transmission device 100 according to the embodiment of the present invention is not limited to the example shown in FIG. 2. For example, the transmission device 100 stores plural pieces of setting information, and selectively uses setting information corresponding to reproduced content data (or content data reproduced by an external device) among the plural pieces of setting information, thereby allocating the sound signals to the respective channels. Hereinafter, a case where the transmission device 100 transmits sound signals on four channels, and the main sound signal is transmitted on the channel 1 and the subsidiary sound signals are transmitted on the channels 2 to 4 will be described as an example.

The reception devices 200 receive sound signals on corresponding channels among sound signals transmitted from the transmission device 100. The reception devices 200 output sounds (which also include music, which is true of the following) corresponding to the received sound signals. In addition, the reception devices 200 transmit a response signal (for example, an ACK packet or a NACK packet) in response to the received result to the transmission device 100. Here, the reception devices 200 include one or two or more pieces of optional hardware which realize a communication function with the transmission device 100, a reproducing function of received sound signals, and an output function of sounds corresponding to the reproduction.

Hereinafter, a case where the reception device 200A receives the main sound signal transmitted on the channel 1, and other reception devices 200 (the reception device 200B and reception devices 200 not shown in the figure) receive the subsidiary sound signals transmitted on the channels 2 to 4 will be described as an example.

The sound signal transmission system 1000 includes the transmission device 100 and the reception devices 200, and the respective reception devices 200 output sounds indicated by the sound signals transmitted from the transmission device 100.

Outline of Sound Signal Transmission Approach

As described above, for example, in the case where a plurality of wireless communication systems exists together in the same range like the sound signal transmission system 1000 and the wireless communication system 2000 shown in FIG. 1, communication interference occurs, and thereby there is concern that communication in another wireless communication system is inhibited.

Here, as methods for preventing the occurrence of the interference, for example, frequency hopping may be used.

FIG. 3 is a diagram illustrating the frequency hopping and shows frequency channels (physical channels) in IEEE 802.11b. As shown in FIG. 3, there are fourteen frequency channels, a frequency channel 1 (CH1 in FIG. 3) to a frequency channel 14 (CH14 in FIG. 3) in IEEE 802.11b, but these frequency channels partially overlap with each other in frequency bands. For this reason, in communication using IEEE 802.11b, in order to prevent the occurrence of the communication interference through the prevention of the overlap, for example, the frequency channels 1, 6, 11 and 14 (CH1, CH6, CH11, and CH14 in FIG. 3) may be used.

If frequency hopping is used, for example, a plurality of wireless communication systems existing in the same range selects any one frequency channel among the frequency channels 1, 6, 11 and 14 such that the frequency channels used to communicate do not overlap with each other. Therefore, there is a possibility that interference can be prevented by using frequency hopping.

However, as described above, even if frequency hopping is used, there are cases where the communication interference occurs due to various factors, and further even if frequency hopping is used, the communication interference which has occurred may not be reduced. Thereby, even if frequency hopping is used, there is concern that communication in a certain wireless communication system interferes with communication in another wireless communication system, and thus the communication in another wireless communication system is inhibited.

As methods for reducing the interference, there are the following methods (a) and (b).

Figure 5:
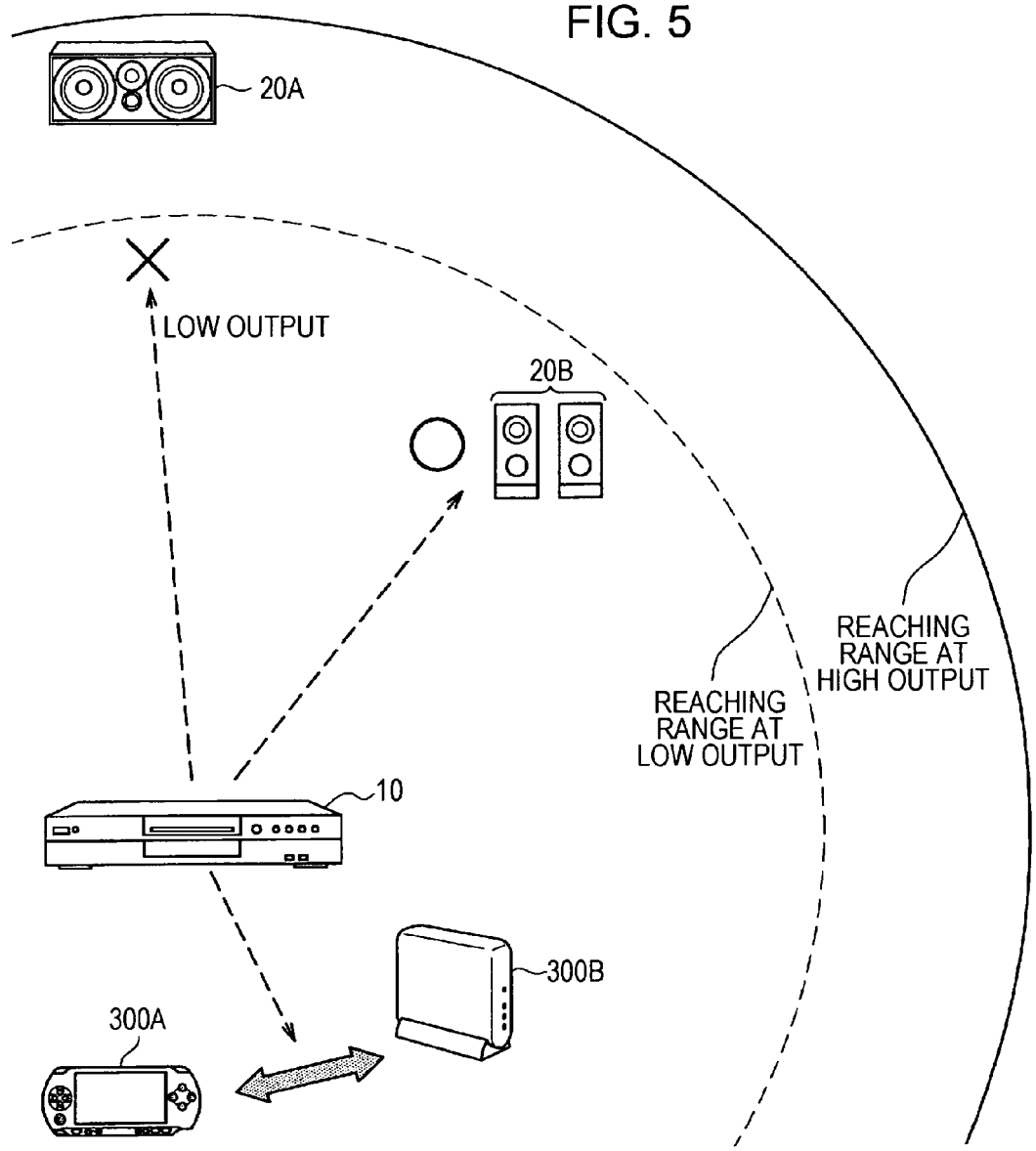
FIG. 5 is a diagram illustrating the first example of the method for reducing interference with communication in another wireless communication system.

FIGS. 4 and 5 are diagrams illustrating a first example of methods for reducing the communication interference in another wireless communication system and show the method (a). Here, FIG. 5 shows an example where a sound signal transmission system including a transmission device 10 and reception devices 20A and 20B and a wireless communication system 2000 including a communication device 300A and a communication device 300B existing together in the same range. Hereinafter, a case where the transmission device 10 shown in FIG. 5 transmits sound signals on four time division channels in the same manner as the transmission device 100 will be described.

As shown in FIG. 4, when the transmission device 10 collectively decreases transmission powers for the sound signals transmitted on the respective channels (the method (a)), since the transmission power for the transmitted sound signals is decreased, it is possible to reduce the interference with communication in the wireless communication system 2000. However, in the above-described case, for example, as shown in FIG. 5, since the sound signals transmitted by the transmission device 10 is not sent to the reception device 20A, a possibility that a sound signal on a corresponding channel is not normally received by the reception device 20A is heightened.

Therefore, in the case of using the method (a), there in concern that a predetermined sound effect such as, for example, a stereophonic effect, may not be achieved in the sound signal transmission system including the transmission device 10 and the reception devices 20A and 20B.

Figure 6:
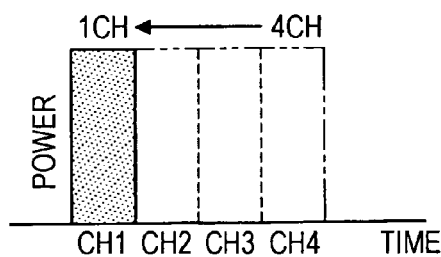
FIG. 6 is a diagram illustrating a second example of a method for reducing interference with communication in another wireless communication system.
Figure 7:
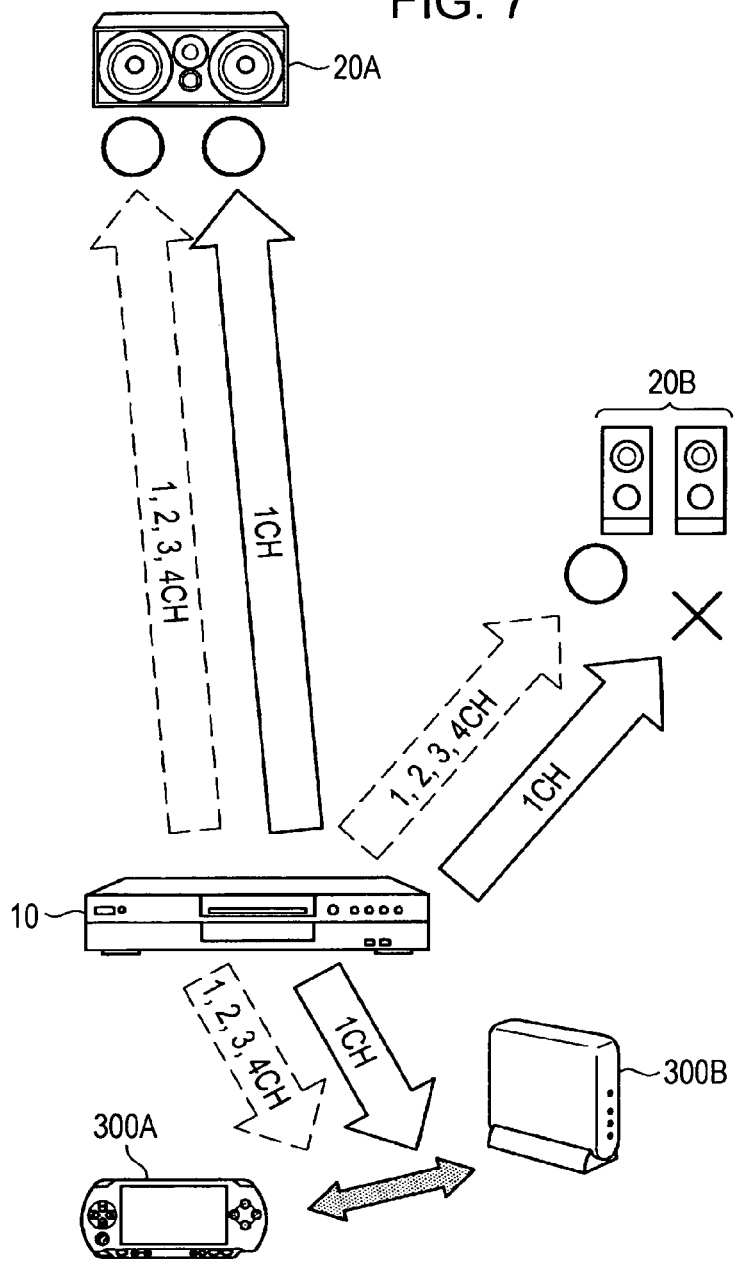
FIG. 7 is a diagram illustrating the second example of the method for reducing interference with communication in another wireless communication system.

In addition, FIGS. 6 and 7 are diagrams illustrating a second example of methods for reducing interference with communication in another wireless communication system and show the method (b). Here, FIG. 7 shows, in the same manner as FIG. 5, an example where a sound signal transmission system including a transmission device 10 and reception devices 20A and 20B and a wireless communication system 2000 including a communication devices 300A and a communication device 300B exist together in the same range. Hereinafter, a case where the transmission device 10 shown in FIG. 7 transmits sound signals on four time division channels in the same manner as the transmission device 100 will be described.

As shown in FIG. 6, when the transmission device 10 decreases the number of channels on which the sound signals are transmitted (FIG. 6 shows an example where one channel among four channels is set) (the method (b)), a time occupancy of the transmitted sound signals is reduced and thereby it is possible to decrease interference with communication in the wireless communication system 2000. However, in the above-described case, for example, as shown in FIG. 7, corresponding sound signals are not transmitted to the reception devices 20B from the transmission device 10, and thus the reception devices 20B do not receive sound signals on corresponding channels.

Therefore, in the case of using the method (b), a predetermined sound effect such as, for example, a stereophonic effect, may not be achieved in the sound signal transmission system including the transmission device 10 and the reception devices 20A and 20B.

As described above, in the case of using only the frequency hopping, the interference which has occurred may not be reduced. In the case of using the methods (a) and (b), even if the interference with communication in another wireless communication system can be reduced, there is concern that convenience for a user in the sound signal transmission system is reduced.

Therefore, in the sound signal transmission system 1000 according to the embodiment of the present invention, the transmission device 100 individually controls a transmission power for a sound signal transmitted on each channel, for each channel. More specifically, the transmission device 100 sets a transmission power for each channel and thus transmits sound signals at lower transmission powers which enables each reception device 200 to normally receive the sound signals.

The transmission device 100 individually controls a transmission power for a sound signal transmitted on each channel, for each channel, and thereby it is possible to decrease transmission powers for the sound signals transmitted by the transmission device 100 in the same manner as the method (a). Therefore, it is possible to reduce the interference with communication in the wireless communication system 2000 which is another wireless communication system. In addition, the transmission device 100 individually controls a transmission power for a sound signal transmitted on each channel, for each channel, and thereby the case as shown in FIG. 5 where the sound signals transmitted on the respective channels are not normally received by the corresponding reception devices 200 is prevented.

Therefore, the transmission device 100 individually controls a transmission power for a sound signal transmitted on each channel, for each channel, and thereby it is possible to prevent a reduction in convenience for a user and to reduce interference with communication in another wireless communication system, in the sound signal transmission system 1000.

More specifically, in the sound signal transmission system 1000, the transmission device 100 can prevent a reduction in convenience for a user and reduce interference with communication in another wireless communication system by performing, for example, processes (1) and (2) described below. Here, the processes (1) and (2) described below are examples of processes related to a transmission method according to an embodiment of the present invention. In addition, hereinafter, although not particularly described, the transmission device 100 can perform a process related to the frequency hopping between it and the communication devices constituting another wireless communication system such as, for example, the wireless communication system 2000 and determine frequency bands (frequency channels) used to transmit sound signals.

(1) Transmission Power Setting Process

The transmission device 100 respectively sets a transmission power for transmitting the main sound signal and transmission powers for transmitting one or two or more subsidiary sound signals.

Figure 8:
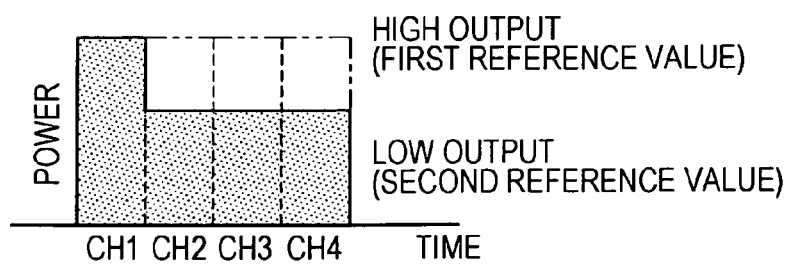
FIG. 8 is a diagram illustrating an example of a transmission power setting process in the transmission device according to the embodiment of the present invention.
Figure 9:
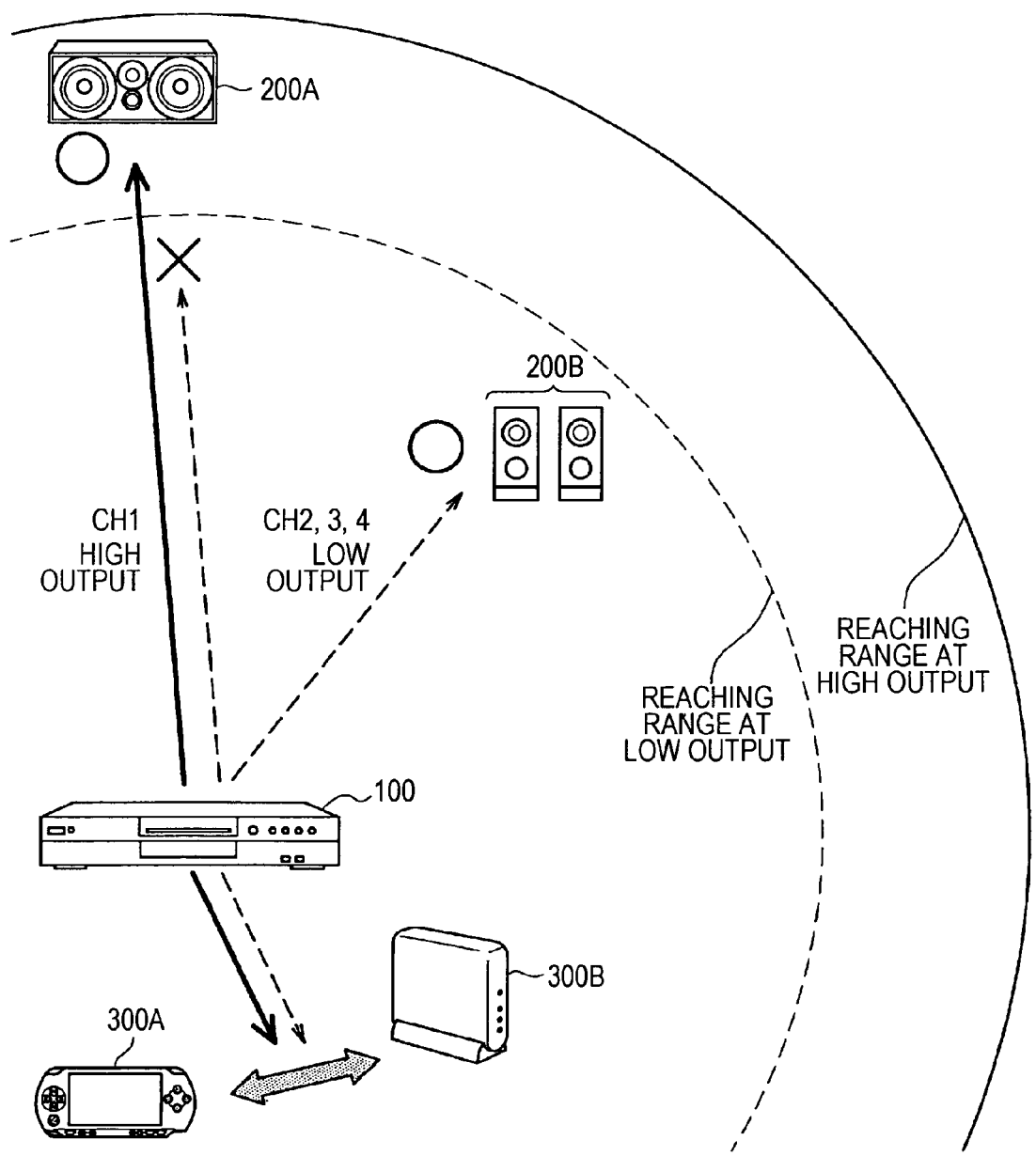
FIG. 9 is a diagram illustrating an example of a transmission power setting process in the transmission device according to the embodiment of the present invention.

FIGS. 8 and 9 are diagrams illustrating an example of the transmission power setting process in the transmission device 100 according to the embodiment of the present invention. Here, FIG. 8 shows an example where the transmission device 100 sets a transmission power for each channel at a certain time slot. In addition, FIG. 9 shows, in the same manner as FIG. 1, an example where the sound signal transmission system 1000 and the wireless communication system 2000 exist together in the same range.

The transmission device 100, as shown in FIG. 8, sets a transmission power for the main sound signal (sound signal transmitted on the channel 1) to a first reference value and sets transmission powers for the subsidiary sound signals (sound signals transmitted on the channels 2 to 4) to a second reference value smaller than the first reference value.

Here, it is assumed that the reception device 200A receiving the main sound signal transmitted on the channel 1 is installed in a place apart from the transmission device 100 such as, for example, a room different from a room in which the transmission device 100 is installed. In other words, in the sound signal transmission system 1000, as the distance (distance between the transmission device 100 and the reception device 200A) where the reception device 200A outputting sounds corresponding to the main sound signal can reproduce the main sound signal increases, there is a high possibility that a reduction in convenience for a user can be prevented. Therefore, the transmission device 100 sets the transmission power for the main sound signal to the first reference value greater than the second reference value.

Here, the first reference value related to the embodiment of the present invention may be, for example, a value indicating the maximal transmission power for a sound signal transmitted from a communication unit (more specifically, a first communication unit described later) included in the transmission device 100. The transmission device 100 sets the value indicating the maximal transmission power as the first reference value, and thereby it is possible to make a sound signal set to the first reference value such as, for example, the main sound signal more reliably received by the corresponding reception device 200. In addition, the first reference value related to the embodiment of the present invention is not limited to the value indicating the maximal transmission power. For example, the first reference value related to the embodiment of the present invention may be a value smaller than the maximal transmission power.

On the other hand, it is assumed that other reception devices 200 such as the reception devices 200B receiving the subsidiary sound signals transmitted on the channels 2 to 4 are installed in a closer place than the reception device 200A in the distance between it and the transmission device 100, such as, for example, the same room in which the transmission device 100 is installed. In other words, even if the transmission device 100 sets the transmission powers for the subsidiary sound signals to the second reference value lower than the first reference value, there is a low possibility that the reception devices 200 receiving the subsidiary sound signals do not normally receive the subsidiary sound signals. Therefore, the transmission device 100 sets the transmission powers for the subsidiary sound signals to the second reference value lower than the first reference value. In addition, the transmission device 100 may set a transmission power set for a channel used to transmit a specific subsidiary sound signals to the first reference value based on, for example, a user's operation or the like.

The transmission device 100 sets a transmission power for each channel based on, for example, the usage of the transmitted sound signals as described above. As described above, since the transmission power for each channel is set, in the sound signal transmission system 1000, for example, as shown in FIG. 9, it is possible to enable the respective reception devices 200 to receive the corresponding sound signals. Therefore, since the transmission device 100 sets a transmission power for each channel based on, for example, the usage of the transmitted sound signals as described above, it is possible to prevent the case where the reception devices 200 do not normally receive the sound signals and to reduce the interference with communication in the wireless communication system 2000.

In addition, the transmission power setting process in the transmission device 100 according to the embodiment of the present invention is not limited to the above-described case. For example, the transmission device 100 may determine a transmission power necessary to enable the respective reception devices 200 to normally receive the transmitted sound signals based on a positional relationship between the transmission device 100 and the respective reception devices 200. Here, the transmission device 100 transmits, for example, a directional distance measuring signal to the respective reception devices 200, and can ascertain the positional relationship by specifying a distance and a direction between it and each of the reception devices 200. More specifically, for example, the transmission device 100 ascertains the positional relationship by specifying a distance and a direction between it and each of the reception devices 200 based on a time interval between a transmission starting time of the distance measuring signal and a reception time of a response signal transmitted from each of the reception devices 200 in response to the distance measuring signal. Methods of ascertaining the positional relationship between the transmission device 100 and each of the reception devices 200 are not limited to the above-described method.

In addition, for example, the transmission device 100 may independently adjust the transmission power set for each channel. More specifically, for example, the transmission device 100 independently adjusts the transmission power set for each channel based on the number of NACK packets (negative acknowledgement packets) for the respective channels which are received by a communication unit (more specifically, a first communication unit described later) during a predetermined period, and independently adjusts the transmission powers for the respective channels.

Example of Adjustment Process of Transmission Power Set By Transmission Device 100

Figure 10:
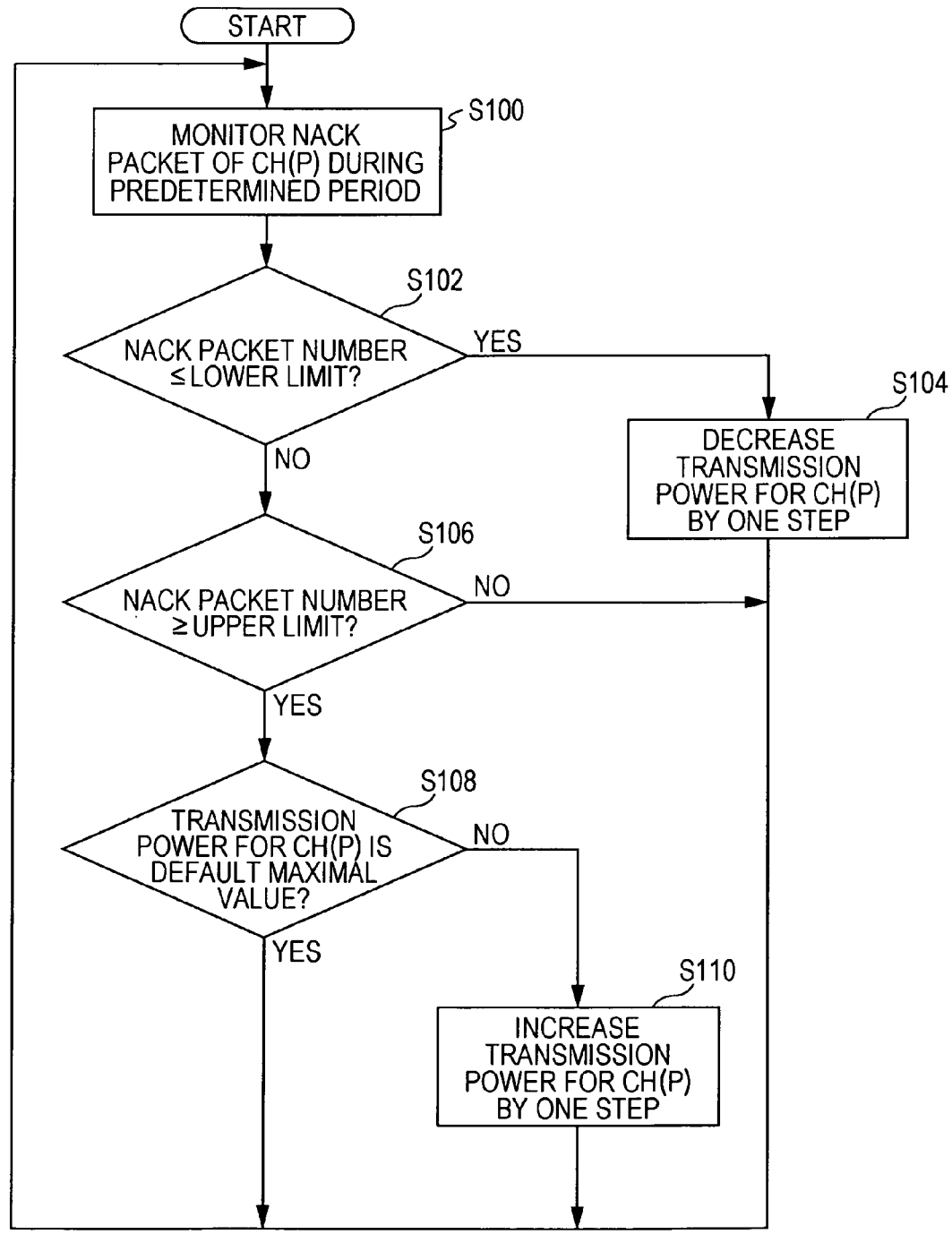
FIG. 10 is a flowchart illustrating an example of an adjustment process of the set transmission power in the transmission device according to the embodiment of the present invention.

FIG. 10 is a flowchart illustrating an example of an adjustment process of the transmission powers set by the transmission device 100 according to the embodiment of the present invention.

Here, FIG. 10 shows an example of an adjustment process of a transmission power for a sound signal transmitted on a channel P (where P denotes a channel number and which is indicated by "CH (P) in the figure"). Although an example of an adjustment process of a transmission power for a sound signal transmitted on the channel P is hereinafter described with reference to FIG. 10, the transmission device 100 may perform the process shown in FIG. 10 independently for each channel. In addition, when the transmission device 100 performs the processes shown in FIG. 10 for the respective channels, the processes may be performed sequentially or simultaneously.

In addition, FIG. 10 shows an example where the transmission device 100 adjusts the set transmission power with level units set in advance. Here, the transmission device 100 separates a range of the settable transmission power into constant values, and thereby sets each level such that an adjustment amount becomes constant, but the levels set by the transmission device 100 are not limited to the above-described example. For example, the transmission device 100 may set each level such that an adjustment amount is not constant by increasing the adjustment amount as the set transmission power is large.

The transmission device 100 monitors a NACK packet for the channel P during a predetermined period (S100). More specifically, the transmission device 100 determines if the NACK packet for the channel P is received based on various kinds of packets received by a reception unit (more specifically, the first communication unit described later). In addition, if it is determined that the NACK packet for the channel P is received, the transmission device 100 counts the number of the NACK packets for the channel P.

Here, the transmission device 100, for example, periodically starts the process in step S100, but the adjustment process in the transmission device 100 is not limited to periodically starting the process in the step S100. For example, in a case or the like where communication is not performed in another wireless communication system 2000 (for example, a case or the like where a process influencing the frequency hopping is not performed), the transmission device 100 may perform the process in step S100 non-periodically.

In addition, the predetermined period related to the process in step S100 is set in advance according to a time interval for performing the process in step S100 (for example, a case where the process in step S100 is periodically performed), but a method of setting the predetermined period related to the process in step S100 is not limited to the above-described example. For example, the transmission device 100 may store a table in which the number of other wireless communication systems existing in the same range is correlated with periods, and may determine a predetermined period related to the process in step S100 based on the number of detected other wireless communication systems, the number of other wireless communication systems designated by a user, or the like.

After the predetermined period in step S100 has elapsed, the transmission device 100 determines whether or not the number of the NACK packets is equal to or less than a predetermined lower limit (or, smaller than the predetermined lower limit, which is true of the following) (S102).

If it is determined that the number of the NACK packets is equal to or less than the predetermined lower limit in step S102, the transmission device 100 decreases the transmission power for the channel P by one level from the set value (S104). Then, the transmission device 100 repeats the process from step S100. Here, the lower limit in step S102 may be a fixed value set in advance, or may be an adjustable value in a predetermined range which enables the effect due to application of the sound signal transmission approach according to the embodiment of the present invention to be achieved.

In addition, in step S102, if it is not determined that the number of the NACK packets is equal to or less than the predetermined lower limit, the transmission device 100 determines whether or not the number of the NACK packets is equal to or more than a predetermined upper limit (or, larger than the predetermined upper limit, which is true of the following) (S106). Here, in the same manner as the lower limit, the upper limit in step S106 may be a fixed value set in advance, or may be an adjustable value in a predetermined range which enables the effect due to application of the sound signal transmission approach according to the embodiment of the present invention to be achieved.

In step S106, if it is not determined that the number of the NACK packets is equal to or more than the predetermined upper limit, the transmission device 100 does not adjust the transmission power for the channel P but repeats the process from step S100.

In addition, in step S106, if it is determined that the number of the NACK packets is equal to or more than the upper limit, the transmission device 100 determines whether or not the transmission power set for the channel P is the maximal value set in advance (S108).

In step S108, if it is determined that the set transmission power is the maximal value set in advance, the transmission device 100 does not adjust the transmission power for the channel P but repeats the process from step S100.

In addition, in step S108, if it is not determined that the set transmission power is the maximal value set in advance, the transmission device 100 increases the transmission power for the channel P by one level from the set value (S110). Further, the transmission device 100 repeats the process from step S100.

The transmission device 100 adjusts the transmission power for the channel P by performing, for example, the processes shown in FIG. 10. The adjustment process of the set transmission power in the transmission device 100 according to the embodiment of the present invention is not limited to the process in FIG. 10.

(2) Transmission Process

The transmission device 100 respectively transmits the main sound signal and one or two or more subsidiary sound signals on the allocated channels based on the transmission powers set by the process (1) (the transmission power setting process).

Here, the transmission device 100 transmits the sound signals in a numerical order of the channels based on a predetermined rule such as, for example, an ascending order or a descending order, but the transmission method of the sound signals in the transmission device 100 is not limited to the above description.

Figure 11:
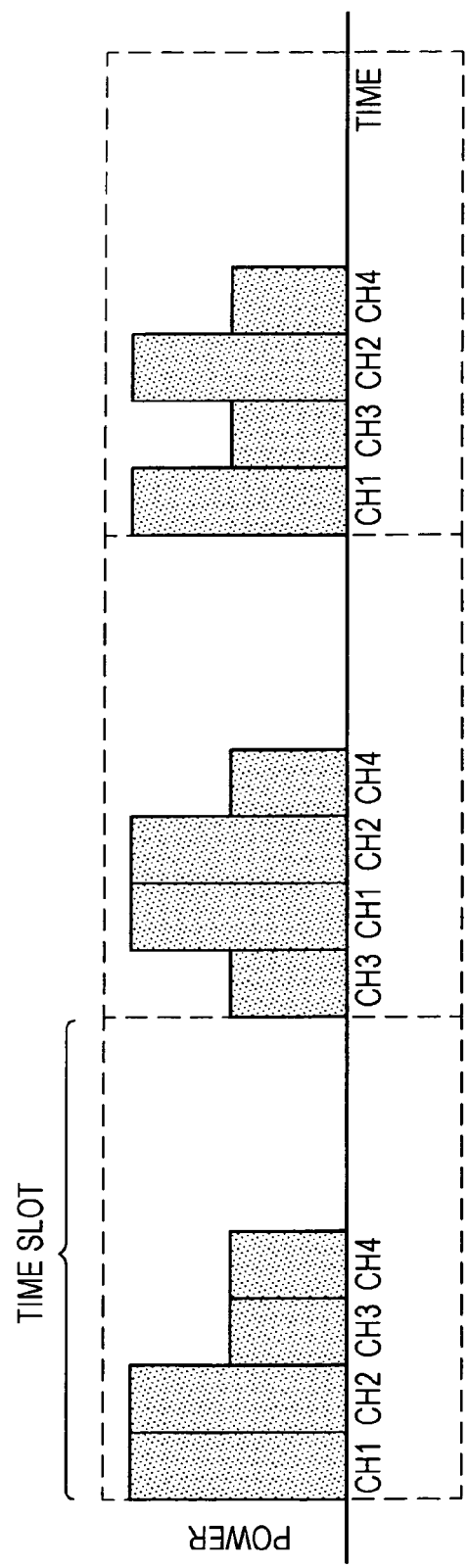
FIG. 11 is a diagram illustrating an example of a transmission process in the transmission device.

FIG. 11 is a diagram illustrating an example of the transmission process in the transmission device 100. Here, FIG. 11 shows an example where the transmission device 100 transmits sound signals for which the transmission powers are set to the first reference value on the channel 1 and the channel 2 and transmits sound signals for which the transmission powers are set to the second reference value on the channel 3 and the channel 4. The transmission device 100, for example, as shown in FIG. 11, is not limited to transmitting the sound signals in the numerical order of the channels, but may change the order of the sound signals to be transmitted on the respective channels for each time slot.

Example of Transmission Process in Transmission Device 100

More specifically, an example of a transmission process in the transmission device 100 which can change the order of the sound signals to be transmitted on the respective channels will be described. For example, if the transmission device 100 includes a first communication unit (described later) related to transmission of sound signals and a second communication unit (described later) which communicates with an external device via a communication path different from the first communication unit, which are related to the transmission of the sound signals, the transmission device 100 changes the order of the sound signals to be transmitted on the respective channels for each time slot based on a state of communication using the second communication unit.

Figure 12:
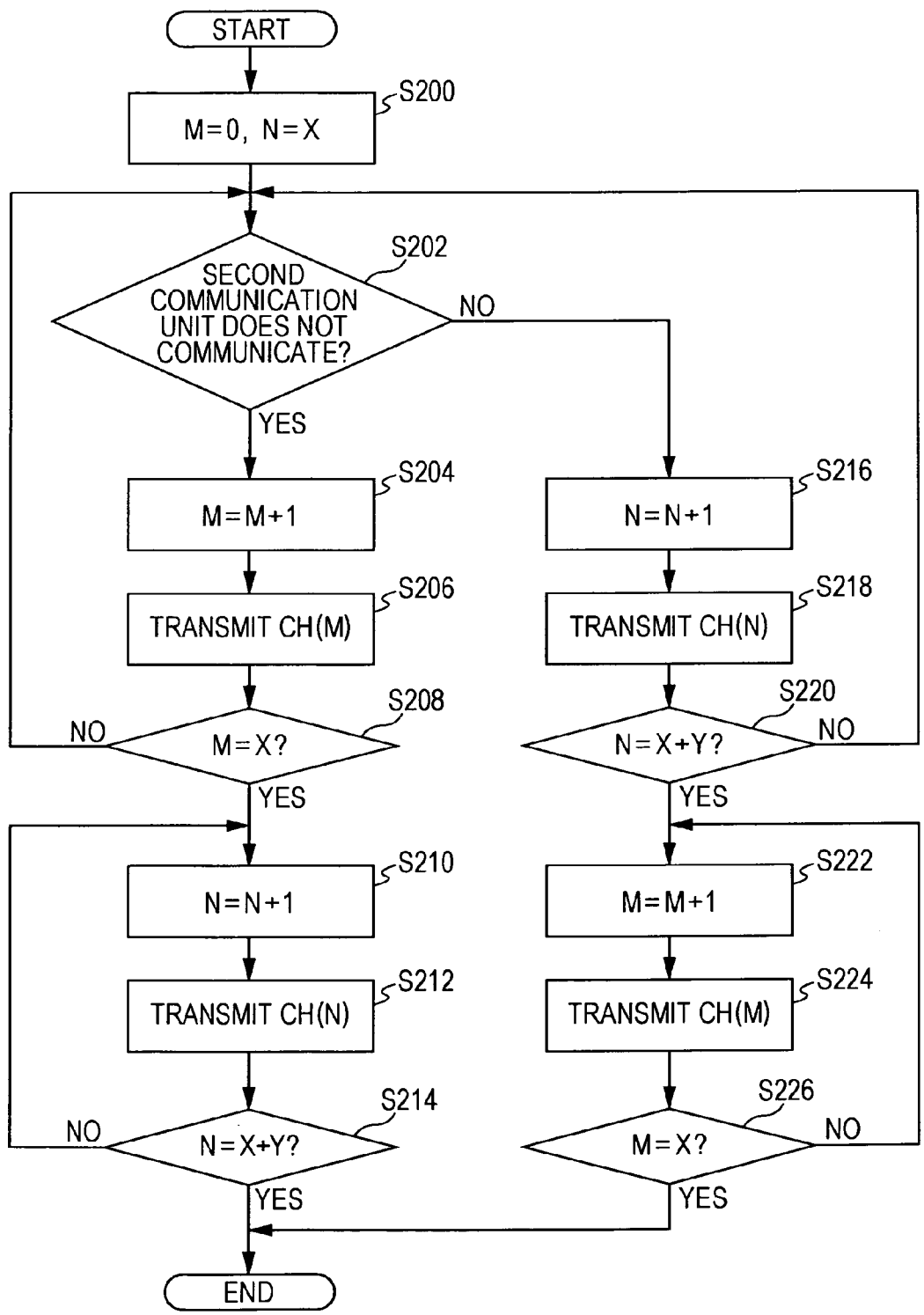
FIG. 12 is a flowchart illustrating an example of a transmission process in the transmission device according to the embodiment of the present invention.

FIG. 12 is a flowchart illustrating an example of the transmission process in the transmission device 100 according to the embodiment of the present invention, and shows an example of the transmission process for each time slot. Here, FIG. 12 shows an example where the transmission device 100 performs the transmission process in a case where a number of a channel for which the transmission power is set to the first reference value (or a channel adjusted with respect to the first reference value, which is true of the following) is set to a lower number.

The transmission device 100 sets M=0 and N=X (S200). The process in step S200 corresponds to an initialization process of initializing the values of "M" and "N". Here, "M" shown in FIG. 12 is a value indicating a number of a channel for which the transmission power is set to the first reference value. In addition, "N" shown in FIG. 12 is a value indicating a number of a channel (or a channel adjusted with respect to the second reference value, which is true of the following) for which the transmission power is set to the second reference value. Further, "X" shown in FIG. 12 denotes the number of the channels of which the transmission powers are set to the first reference value. In the figure, a channel M is denoted by "CH (M)" and a channel N is denoted by "CH (N)".

The transmission device 100 determines whether or not communication is not performed in the second communication unit (S202).

Case where Communication is not Performed in Second Communication Unit

In step S202, if it is determined that the communication is not performed in the second communication unit, the transmission device 100 updates the value of "M" to M=M+1 (S204). In addition, the transmission device 100 transmits the channel M (S206). The channel M is transmitted when it is determined that the communication is not performed in the second communication unit, and thus the transmission device 100 can further reduce a possibility that the channel M is transmitted when it is determined that the communication is performed in the second communication unit. Therefore, the channel M is transmitted when it is determined that the communication is not performed in the second communication unit, and thereby the transmission device 100 can further reduce interference with the communication in the second communication unit at all the time slots for a processed target.

If the channel M is transmitted in step S206, the transmission device 100 determines whether or not the value of "M" is M=X (S208).

In step S208, if it is not determined that the value of "M" is M=X, the transmission device 100 repeats the process from step S202.

On the other hand, if it is determined that the value of "M" is M=X in step S208, the transmission device 100 updates the value of "N" to N=N+1 (S210). The transmission device 100 transmits the channel N (S212).

If the channel N is transmitted in step S212, the transmission device 100 determines whether or not the value of "N" is N=X+Y (S214). Here, "Y" shown in FIG. 12 denotes the number of channels for the transmission powers set to the second reference value. In other words, the process in step S214 corresponds to the determination as to whether or not the transmission device 100 transmits the sound signals on all the channels.

In step S214, if it is not determined that the value of "N" is N=X+Y, the transmission device 100 repeats the process from step S210. On the other hand, in step S214, if it is determined that the value of "N" is N=X+Y, the transmission device 100 finishes the transmission process.

Case where Communication is Performed in Second Communication Unit

In step S202, if it is determined that the communication is performed in the second communication unit, the transmission device 100 updates the value of "N" to N=N+1 (S216). In addition, the transmission device 100 transmits the channel N (S218). The channel N is transmitted when it is determined that the communication is performed in the second communication unit, and thus the transmission device 100 can further reduce interference with the communication in the second communication unit than the case of transmitting the channel M.

If the channel N is transmitted in step S218, the transmission device 100 determines whether or not the value of "N" is N=X+Y (S220).

In step S220, if it is not determined that the value of "N" is N=X+Y, the transmission device 100 repeats the process from step S202.

On the other hand, if it is determined that the value of "N" is N=X+Y in step S220, the transmission device 100 updates the value of "M" to M=M+1 (S222). The transmission device 100 transmits the channel M (S224).

If the channel M is transmitted in step S224, the transmission device 100 determines whether or not the value of "M" is M=X (S226). Here, the process in step S226 corresponds to the determination as to whether or not the transmission device 100 transmits the sound signals on all the channels.

In step S226, if it is not determined that the value of "M" is M=X, the transmission device 100 repeats the process from step S222. On the other hand, in step S226, if it is determined that the value of "M" is M=X, the transmission device 100 finishes the transmission process.

The transmission device 100 can change the order of the sound signals to be transmitted on the respective channels for each time slot based on a state of the communication using the second communication unit by performing, for example, the processes shown in FIG. 12. The transmission process in the transmission device 100 according to the embodiment of the present invention is not limited to the processes shown in FIG. 12.

In the sound signal transmission system 1000, the transmission device 100 transmits the sound signals to the reception devices 200 through, for example, the process (1) (transmission power setting process) and the process (2) (transmission process). Here, the transmission device 100 individually sets the transmission power for the transmitted sound signal for each channel (the process (1)) and transmits the sound signal at the set transmission power (the process (2)). Therefore, in the sound signal transmission system 1000, in the same manner as the method (a), since the transmission device 100 decreases the transmission powers for the transmitted sound signals, it is possible to reduce interference with communication in the wireless communication system 2000 which is another wireless communication system. Further, in the sound signal transmission system 1000, the transmission device 100 individually sets the transmission power for the sound signal for each channel, and thus, for example, as shown in FIG. 5, the case where the sound signals on the respective channels are not normally received by the reception devices 200 is prevented.

Therefore, the transmission device 100 performs the process (1) (transmission power setting process) and the process (2) (transmission process) related to the sound signal transmission approach, and thus the sound signal transmission system which can prevent a reduction in convenience for a user and reduce interference with communication in another wireless communication system is implemented.

Transmission Device According to Embodiment of Present Invention

Next, a configuration example of the transmission device 100 which can perform the processes related to the sound signal transmission approach according to the embodiment of the present invention and which constitutes the sound signal transmission system 1000 will be described.

Figure 13:
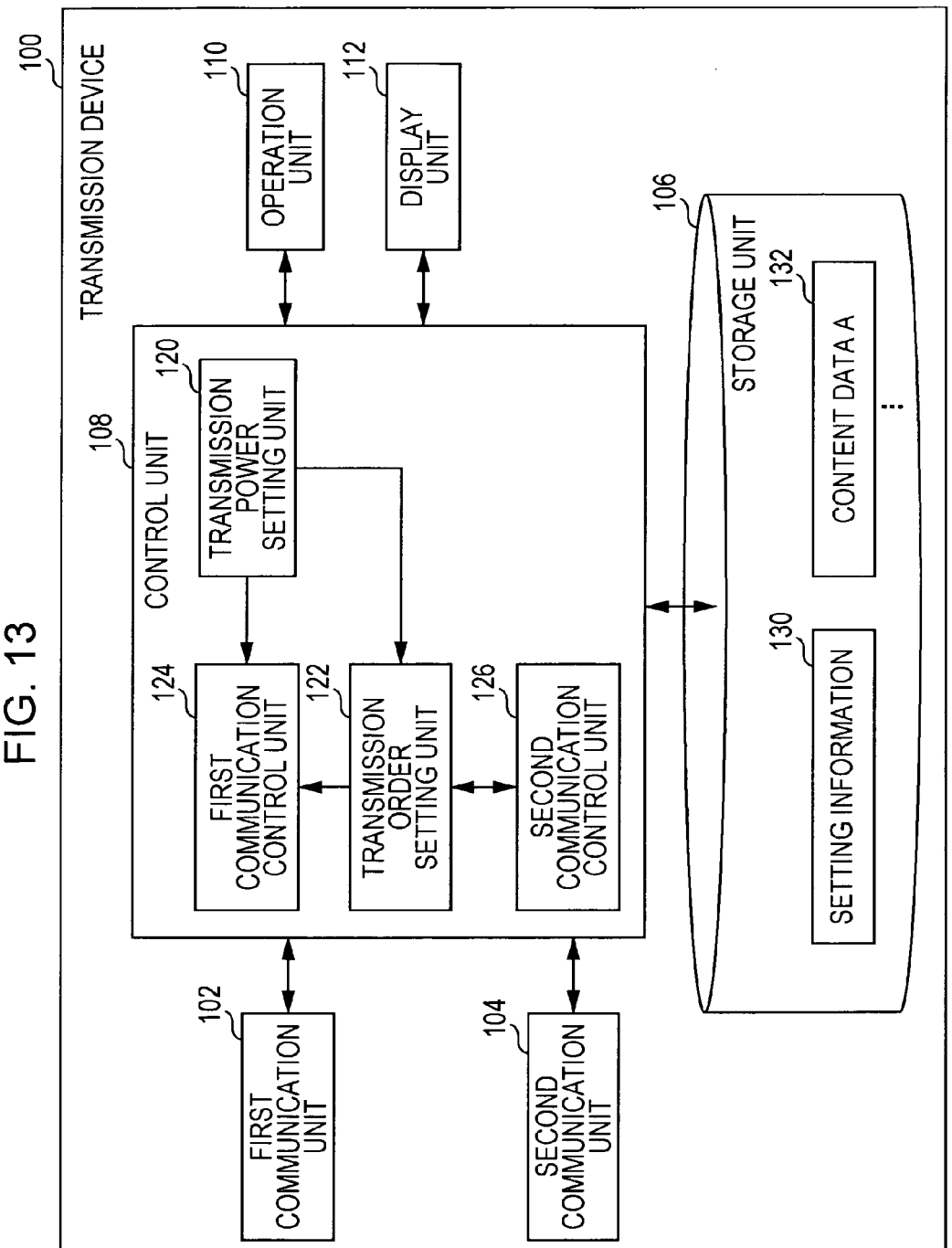
FIG. 13 is a block diagram illustrating a configuration example of the transmission device according to the embodiment of the present invention.

FIG. 13 is a block diagram illustrating a configuration example of the transmission device 100 according to the embodiment of the present invention. The transmission device 100 includes a first communication unit 102, a second communication unit 104, a storage unit 106, a control unit 108, an operation unit 110, and a display unit 112.

In addition, the transmission device 100 may include, for example, ROM (Read Only Memory) (not shown), RAM (Random Access Memory) (not shown) or the like. In the transmission device 100, the respective constituent elements are connected to each other via, for example, a bus which is a data transmission path.

Here, the ROM (not shown) stores programs used by the control unit 108 or control data such as operation parameters. The RAM (not shown) primarily stores programs and the like executed by the control unit 108. Hardware Configuration Example of Transmission Device 100

FIG. 14 is a diagram illustrating a hardware configuration example of the transmission device 100 according to the embodiment of the present invention. Referring to FIG. 14, the transmission device 100 includes, for example, an MPU 150, a ROM 152, a RAM 154, a recording medium 156, an input and output interface 158, an operation input device 160, a display device 162, an communication interface 164. In the transmission device 100, the respective constituent elements are connected to each other via, for example, a bus 166 which is a data transmission path.

The MPU 150 is constituted by an MPU (Micro Processing Unit), an integrated circuit which integrates a plurality of circuits for realizing a control function, or the like, and functions as the control unit 108 which controls the entire transmission device 100. The MPU 150 may function as a transmission power setting unit 120, a transmission order setting unit 122, a first communication control unit 124, and a second communication control unit 126, which are described later, in the transmission device 100.

The ROM 152 stores programs used by the MPU 150, control data such as operation parameters, and the like. The RAM 154 primarily stores programs and the like executed by, for example, the MPU 150.

The recording medium 156 functions as the storage unit 106, and stores various kinds of data such as, for example, setting information, content data such as audio data or video data, applications, and the like. Here, the recording medium 156 may include, for example, a magnetic recording medium such as a hard disc, or nonvolatile memories such as EEPROM (Electrically Erasable and Programmable Read Only Memory), a flash memory, MRAM (Magnetoresistive Random Access Memory), FeRAM (Ferroelectric Random Access Memory), PRAM (Phase change Random Access Memory) and the like. In addition, the transmission device 100 may include the recording medium 156 which is attachable to and detachable from the transmission device 100.

The input and output interface 158 is connected to, for example, the operation input device 160 or the display device 162. The operation input device 160 functions as the operation unit 110 and the display device 162 functions as the display unit 112. Here, the input and output interface 158 includes, for example, USB (Universal Serial Bus) terminals, DVI (Digital Visual Interface) terminals, HDMI (High-Definition Multimedia Interface) terminals, various kinds of processing circuits, and the like. The operation input device 160 is, for example, provided on the transmission device 100 and is connected to the input and output interface 158 inside the transmission device 100. The operation input device 160 includes, for example, buttons, direction keys, rotary type selectors such as jog dials, the combination thereof, and the like. The display device 162 is, for example, provided on the transmission device 100 and is connected to the input and output interface 158 inside the transmission device 100. The display device 162 includes, for example, a liquid crystal display (LCD), an organic EL display (organic ElectroLuminescence display also called an OLED display (Organic Light Emitting Diode display)), and the like. Of course, the input and output interface 158 may be connected to an operation input device (for example, a keyboard, a mouse, and the like) which is an external device of the transmission device 100 or a display device (for example, an external display and the like). The display device 162 may be, for example, a touch screen or the like which enables display and a user's operation to be performed.

The communication interface 164 which is a communication unit provided in the transmission device 100 and functions as the first communication unit 102 and the second communication unit 104 which communicate with external devices such as the reception devices 200 or a server (not shown) in a wireless or wired manner via a network (or directly). Here, the communication interface 164 includes, for example, IEEE 802.11g port and transceiver circuit (wireless communication), IEEE 802.15.1 port and transceiver circuit (wireless communication), communication antenna and RF circuit (wireless communication), LAN terminal and transceiver circuit (wired communication), and the like.

FIG. 14 shows the example where the transmission device 100 includes a single communication interface 164 which functions as the first communication unit 102 and the second communication unit 104, but the hardware configuration of the transmission device 100 according to the embodiment of the present invention is not limited to the example shown in FIG. 14. For example, the transmission device 100 may include a first communication interface functioning as the first communication unit 102 and a second communication interface functioning as the second communication unit 104, respectively.

Here, the network related to the embodiment of the present invention may include, for example, a wired network such as LAN (Local Area Network) or WAN (Wide Area Network), a wireless network such as wireless WAN (WWAN; Wireless Wide Area Network) or wireless MAN (WMAN; Wireless Metropolitan Area Network), Internet using a communication protocol such as TCP/IP (Transmission Control Protocol/Internet Protocol), and the like.

The transmission device 100 performs the processes related to the sound signal transmission approach according to the embodiment of the present invention, using, for example, the configuration shown in FIG. 14. In addition, the hardware configuration of the transmission device 100 according to the embodiment of the present invention is not limited to the configuration shown in FIG. 14. For example, the transmission device 100 may include various kinds of processing circuits which function as reproduction processing units (not shown), such as, a DSP (Digital Signal Processor) which processes audio data (an example of content data) or a video processing circuit which processes video data (an example of content data). Further, the transmission device 100 may include a sound output device which is constituted by amplifiers or speakers.

Referring to FIG. 13 again, the constituent elements of the transmission device 100 will be described. The first communication unit 102 is a first communication section included in the transmission device 100 and transmits sound signals on time division channels using the same frequency band. Signals transmitted by the first communication unit 102 are not limited to the sound signals. For example, the transmission device 100 may transmit various signals such as a distance measuring signal and the like. Here, the first communication unit 102 may include, for example, IEEE 802.11g port and transceiver circuit, IEEE 802.15.1 port and transceiver circuit, or the like.

The second communication unit 104 is a second communication section included in the transmission device 100 and communicates with an external device via a communication path different from the first communication unit 102. Here, the second communication unit 104 may include, for example, IEEE 802.11g port and transceiver circuit, IEEE 802.15.1 port and transceiver circuit, communication antenna and RF circuit, or the like.

The storage unit 106 is a storage section included in the transmission device 100. Here, the storage unit 106 may include, for example, a magnetic recording medium such as a hard disc, a nonvolatile memory such as a flash memory, or the like.

In addition, the storage unit 106 stores various kinds of data such as, for example, setting data, content data, application, and the like. Here, FIG. 13 shows an example where a piece of setting information 130 and content data A132 are stored in the storage unit 106.

The control unit 108 is constituted by, for example, an MPU or an integrated circuit which integrates various kinds of processing circuits and controls the entire transmission device 100. In addition, the control unit 108 includes the transmission power setting unit 120, the transmission order setting unit 122, the first communication control unit 124, and the second communication control unit 126, and mainly performs the processes related to the sound signal transmission approach according to the embodiment of the present invention. The control unit 108 may be provided with a reproduction processing unit (not shown) which reproduces content data.

The transmission power setting unit 120 mainly performs the process (1) (transmission power setting process). More specifically, the transmission power setting unit 120 sets the transmission power for the main sound signal to the first reference value and sets the transmission powers for the subsidiary sound signals to the second reference value.

Here, the transmission power setting unit 120 allocates transmitted sound signals to the respective channels based on, for example, sound signals corresponding to content data reproduced by the production processing unit (not shown) or content data reproduced by an external device (for example, the reproducing device), and the setting information. The transmission power setting unit 120 independently sets transmission powers for the sound signals transmitted on the respective channels. In addition, the transmission device 100 according to the embodiment of the present invention is not limited to the configuration in which the transmission power setting unit 120 allocates the transmitted sound signals to the respective channels. For example, the transmission device 100 may be provided with a channel allocation unit (not shown) in which the control unit 108 allocates the transmitted sound signals to the respective channels.

In addition, by performing, for example, the processes shown in FIG. 10, the transmission power setting unit 120 can adjust a transmission power for each channel set based on the number of NACK packets for each channel, which is received by the first communication unit 102 during a predetermined period.

The transmission order setting unit 122 mainly performs a portion of the process (2) (transmission process). More specifically, the transmission order setting unit 122 sets an order of the sound signals to be transmitted on the respective channels for each time slot.

Here, the transmission order setting unit 122 sets an order of the sound signals to be transmitted, for example, to a numerical order of the channels, but the process in the transmission order setting unit 122 is not limited to the above description. For example, the transmission order setting unit 122 performs the processes shown in FIG. 12, and thereby can change the order of the sound signals to be transmitted on the respective channels for each time slot based on the communication state of the second communication unit 104. Here, in the above-described case, the transmission order setting unit 122 ascertains the communication state of the second communication unit 104 along with the second communication control unit 126 and thereby changes the order of the sound signals to be transmitted on the respective channels for each time slot.

The first communication control unit 124 controls communication in the first communication unit 102 and mainly performs a portion of the process (2) (transmission process). More specifically, the first communication control unit 124 makes the first communication unit 102 transmit the sound signals on the respective channels based on, for example, the transmission powers set by the transmission power setting unit 120 and the transmitted order set by the transmission order setting unit 122. In addition, the first communication control unit 124, for example, performs processes related to the frequency hopping in communication using the first communication unit 102.

The second communication control unit 126 controls communication in the second communication unit 104. In addition, the second communication control unit 126 transmits a communication state of the second communication unit 104 to the transmission order setting unit 122, for example, in response to a request from the transmission order setting unit 122. The second communication control unit 126 may transmit the communication state of the second communication unit 104 to the transmission order setting unit 122, for example, periodically or non-periodically.

The control unit 108 includes, for example, the transmission power setting unit 120, the transmission order setting unit 122, the first communication control unit 124, and the second communication control unit 126, and mainly performs the process related to the sound signal transmission according to the embodiment of the present invention. In addition, in a case where the transmission device 100 does not include, for example, the second communication unit 104, the control unit 108 may not include the second communication control unit 126.

The operation unit 110 is an operation section included in the transmission device 100 and enables a user to perform operations. The transmission device 100 enables a user to perform operations through the operation unit 110 and can perform processes desired by the user based on the user's operation. Here, the operation unit 110 may include, for example, buttons, direction keys, rotary type selectors such as jog dials, or a combination thereof, or the like.

The display unit 112 is a display section included in the transmission device 100 and displays various kinds of information on a display screen. A screen displayed on the display screen of the display unit 112 may include, for example, an operation screen for enabling the transmission device 100 to perform a desired operation, a content reproduction screen according to reproduction of content data, and the like. Here, the display unit 112 may include, for example, an LCD, an organic EL display, and the like. In addition, in the transmission device 100, the display unit 112 may be constituted by a touch screen. In this case, the display unit 112 functions as an operation and display unit which enables both a user's operation and display to be performed.

The transmission device 100 can realize the processes related to the sound signal transmission approach according to the embodiment of the present invention through the configuration shown in FIG. 13. Thus, the transmission device 100 can prevent a reduction in convenience for a user and reduce interference with communication in another wireless communication system, for example, through the configuration shown in FIG. 13.

A configuration of the transmission device 100 according to the embodiment of the present invention is not limited to the configuration shown in FIG. 13. For example, the transmission device 100 may not include the second communication unit 104. Even in this case, the transmission device 100 can perform the process (1) (transmission power setting process) and the process (2) (transmission process) related to the sound signal transmission approach. Therefore, even by the configuration, the transmission device 100 can prevent a reduction in convenience for a user and reduce interference with communication in another wireless communication system.

As described above, the sound signal transmission system 1000 according to the embodiment of the present invention includes the transmission device 100 and the reception devices 200. The transmission device 100 transmits the sound signals to the reception devices 200 by performing the process (1) (transmission power setting process) and the process (2) (transmission process). Here, the transmission device 100 individually sets the transmission power for the transmitted sound signal for each channel (the process (1)) and transmits the sound signal at the set transmission power (the process (2)). Therefore, in the sound signal transmission system 1000, in the same manner as the method (a), since the transmission device 100 decreases the transmission powers for the transmitted sound signals, it is possible to reduce interference with communication in the wireless communication system 2000 which is another wireless communication system. Further, in the sound signal transmission system 1000, the transmission device 100 individually sets the transmission power for the sound signal for each channel, and thus, for example, as shown in FIG. 5, the case where the sound signals on the respective channels are not normally received by the reception devices 200 is prevented.

Therefore, the transmission device 100 performs the process (1) (transmission power setting process) and the process (2) (transmission process) related to the sound signal transmission approach, and thus the sound signal transmission system which can prevent a reduction in convenience for a user and reduce interference with communication in another wireless communication system is implemented.

In addition, when the transmission device 100 includes the second communication unit 104 which communicates with an external device via a communication path different from a communication path used to transmit sound signals to the reception devices 200, it is possible to reduce interference with communication in the second communication unit 104 by performing, for example, the processes shown in FIG. 12.

As above, although the transmission device 100 has been described as a constituent element of the sound signal transmission system 1000 according to the embodiment of the present invention, the embodiment of the present invention is not limited to such a form. The embodiment of the present invention is applicable to various kinds of devices such as, for example, a computer such as a PC (Personal Computer) or a PDA (Personal Digital Assistant), a portable communication device such as a mobile phone or PHS (Personal Handyphone System), an image and sound reproducing device, an image and sound recording and reproducing device, and a game machine.

As above, although the reception devices 200 have been described as a constituent element of the sound signal transmission system 1000 according to the embodiment of the present invention, the embodiment of the present invention is not limited to such a form. The embodiment of the present invention is applicable to various kinds of devices such as, for example, a sound output device such as a speaker, a computer such as a PC, a portable communication device such as a mobile phone, an image and sound reproducing device, an image and sound recording and reproducing device, and a game machine.

Program According to Embodiment of Present Invention

Through a program which enables a computer to function as the transmission device according to the embodiment of the present invention, the computer can individually set a transmission power for a transmitted sound signal for each channel and transmit the sound signal at the set transmission power. Therefore, by using the program which enables a computer to function as the transmission device according to the embodiment of the present invention, it is possible to implement a sound signal transmission system which can prevent a reduction in convenience for a user and reduce interference with communication in another wireless communication system.

As such, although preferred embodiments of the present invention have been described with reference to the accompanying drawings, the present invention is not limited to the embodiments. It is to be understood that numerous other modifications and variations can be apparently devised by those skilled in the art that will fall within the scope of the appended claims and thus that are naturally included in the technical scope of the present invention.

For example, the transmission device according to the embodiment of the present invention may individually include the transmission power setting unit 120, the transmission order setting unit 122, the first communication control unit 124, and the second communication control unit 126 shown in FIG. 13 (for example, each thereof is implemented by an individual processing circuit).

In the above description, although the example where the program (computer program) enabling a computer to function as the transmission device according to the embodiment of the present invention is provided has been described, the embodiment of the present invention may also provide a recording medium storing the program.

Also, in the above description, although the configuration in which the transmission device 100 shown in FIG. 13 transmits sound signals on the respective channels, signals transmitted on the respective channels by the transmission device according to the embodiment of the present invention are not limited to the sound signals. For example, the transmission device according to the embodiment of the present invention may transmit various signals such as image signals indicating images (moving images and still images) on the respective channels. Even in this case, the transmission device according to the embodiment of the present invention performs the process (1) (transmission power setting process) and the process (2) (transmission process) related to the sound signal transmission approach and thereby can prevent a reduction in convenience for a user and decrease interference with communication in another wireless communication system.

The above-described configuration shows an example of the embodiment of the present invention and is naturally included in the technical scope of the present invention.

The present application contains subject matter related to that disclosed in Japanese Priority Patent Application JP 2010-089813 filed in the Japan Patent Office on Apr. 8, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A transmission device comprising:
a transmission power setting unit configured to respectively set a main transmission power for transmitting a main sound signal indicating a main sound and a subsidiary transmission power for transmitting a subsidiary sound signal that produces a predetermined sound effect pertinent to the main sound signal; and
a first communication unit configured to transmit the main sound signal and the subsidiary sound signal on time division channels using the same frequency band, based on the main and subsidiary transmission powers set by the transmission power setting unit,
wherein the transmission power setting unit sets the main transmission power to a first reference value, and sets the subsidiary transmission power to a second reference value smaller than the first reference value;
wherein the transmission power setting unit respectively adjusts the main and subsidiary transmission powers based on the number of negative acknowledgement packets for each of the time division channels that are received by the first communication unit during a predetermined period;
wherein the transmission power setting unit respectively compares the number of the negative acknowledgement packets for each of the time division channels received by the first communication unit during the predetermined period with a predetermined lower limit, and when the number of the negative acknowledgement packets is equal to or less than the predetermined lower limit, sets a transmission power for a sound signal transmitted on the corresponding time division channel to a smaller value than a set value; and
wherein the transmission power setting unit respectively compares the number of the negative acknowledgement packets for each of the time division channels with a predetermined upper limit, and when the number of the negative acknowledgement packets is equal to or more than the predetermined upper limit, sets a transmission power for a sound signal transmitted on the corresponding time division channel to a larger value than the set value.

2. The transmission device according to claim 1, wherein the first reference value indicates a maximum transmission power for a sound signal transmitted by the first communication unit.

3. The transmission device according to any of claims 1 and 2, further comprising:
- a second communication unit that communicates with an external device via a communication path different from the first communication unit; and
- a transmission order setting unit that sets an order of the main sound signal and the subsidiary sound signal to be transmitted based on a communication state of the second communication unit,
- wherein the first communication unit transmits the main sound signal and the subsidiary sound signal in the order set by the transmission order setting unit.

4. The transmission device according to claim 1, wherein the subsidiary sound signal is one of a plurality of subsidiary sound signals that produce the predetermined sound effect, and the plurality of subsidiary sound signals have subsidiary sound powers set to the second reference value.

5. A transmission method comprising the steps of:
- respectively setting a main transmission power for transmitting a main sound signal indicating a main sound and a subsidiary transmission power for transmitting a subsidiary sound signal the produces a predetermined sound effect pertinent to the main sound signal;
- respectively transmitting the main sound signal and the subsidiary sound signal on time division channels using the same frequency band, based on the main and subsidiary transmission powers;
- wherein in the setting step, the transmission power for the main sound signal is set to a first reference value, and the transmission power for the subsidiary sound signal is set to a second reference value smaller than the first reference value;
- respectively adjusting the main and subsidiary transmission powers based on the number of negative acknowledgement packets for each of the time division channels that are received during a predetermined period;
- respectively comparing the number of the negative acknowledgement packets for each of the time division channels received during the predetermined period with a predetermined lower limit, and when the number of the negative acknowledgement packets is equal to or less than the predetermined lower limit, setting a transmission power for a sound signal transmitted on the corresponding time division channel to a smaller value than a set value; and
- respectively comparing the number of the negative acknowledgement packets for each of the time division channels with a predetermined upper limit, and when the number of the negative acknowledgement packets is equal to or more than the predetermined upper limit, setting a transmission power for a sound signal transmitted on the corresponding time division channel to a larger value than the set value.

6. The method according to claim 5, wherein the subsidiary sound signal is one of a plurality of subsidiary sound signals that produce the predetermined sound effect, and the plurality of subsidiary sound signals have subsidiary sound powers set to the second reference value.

7. The method according to claim 5, wherein the first reference value indicates a maximum transmission power for a sound signal transmitted by the first communication unit.

* * * * *